June 6, 1961  K. ROSENBAUM  2,987,013
VEHICLES
Filed Jan. 10, 1956  6 Sheets-Sheet 1

INVENTOR
KURT ROSENBAUM

BY Strauch, Nolan & Neale

ATTORNEYS

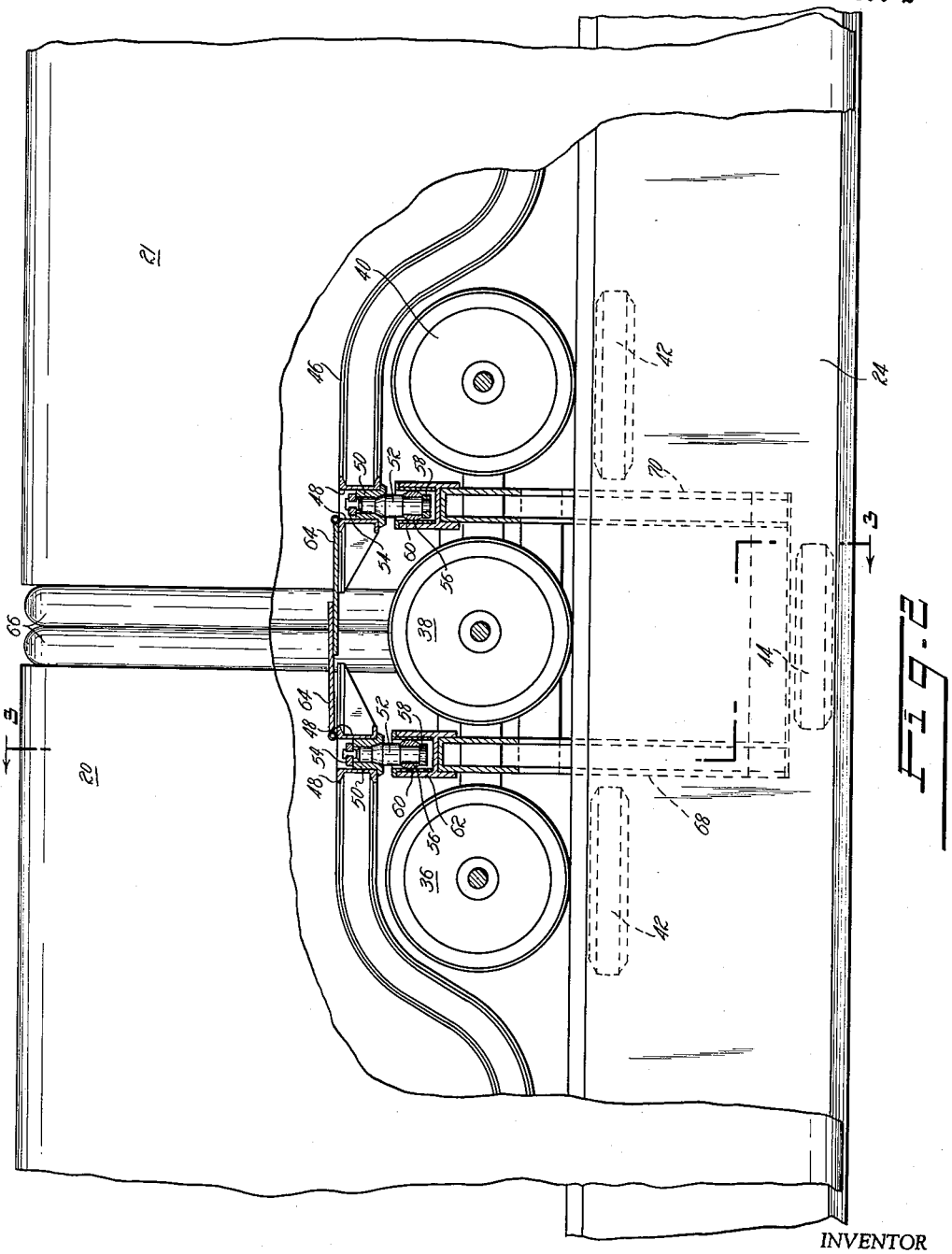

June 6, 1961 K. ROSENBAUM 2,987,013
VEHICLES
Filed Jan. 10, 1956 6 Sheets-Sheet 3

INVENTOR
KURT ROSEBAUM

BY Strauch, Nolan & Neale

ATTORNEYS

June 6, 1961  K. ROSENBAUM  2,987,013
VEHICLES
Filed Jan. 10, 1956  6 Sheets-Sheet 4
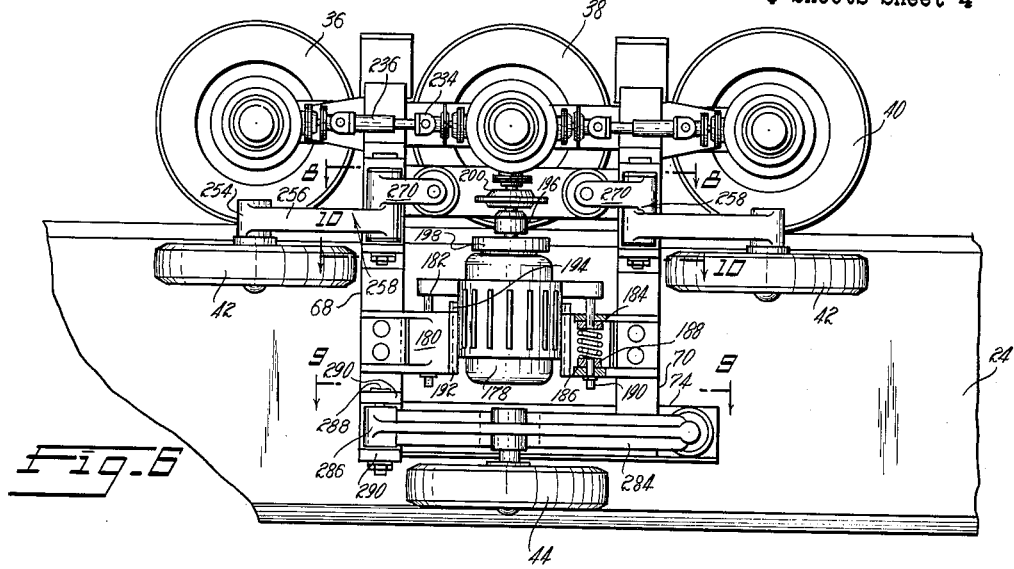
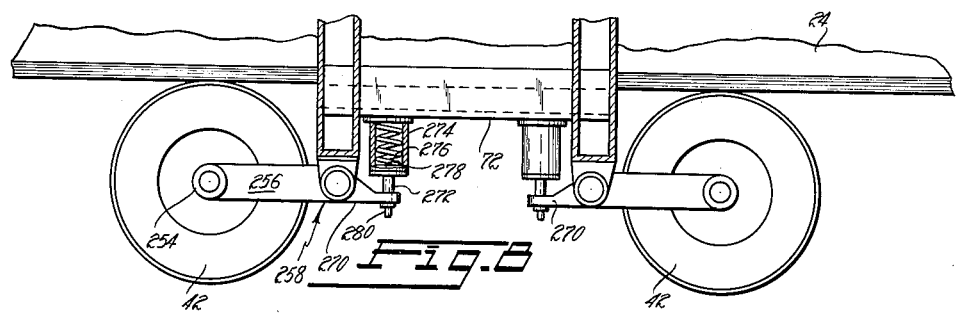
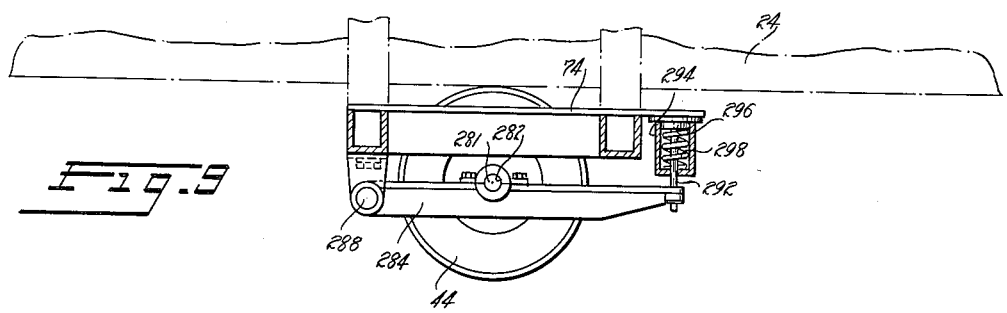
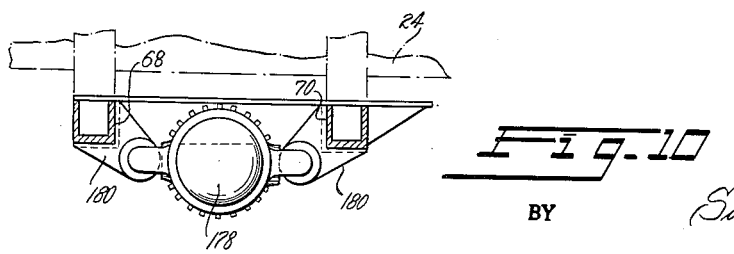
INVENTOR
KURT ROSENBAUM
BY Strauch, Nolan & Neale
ATTORNEYS

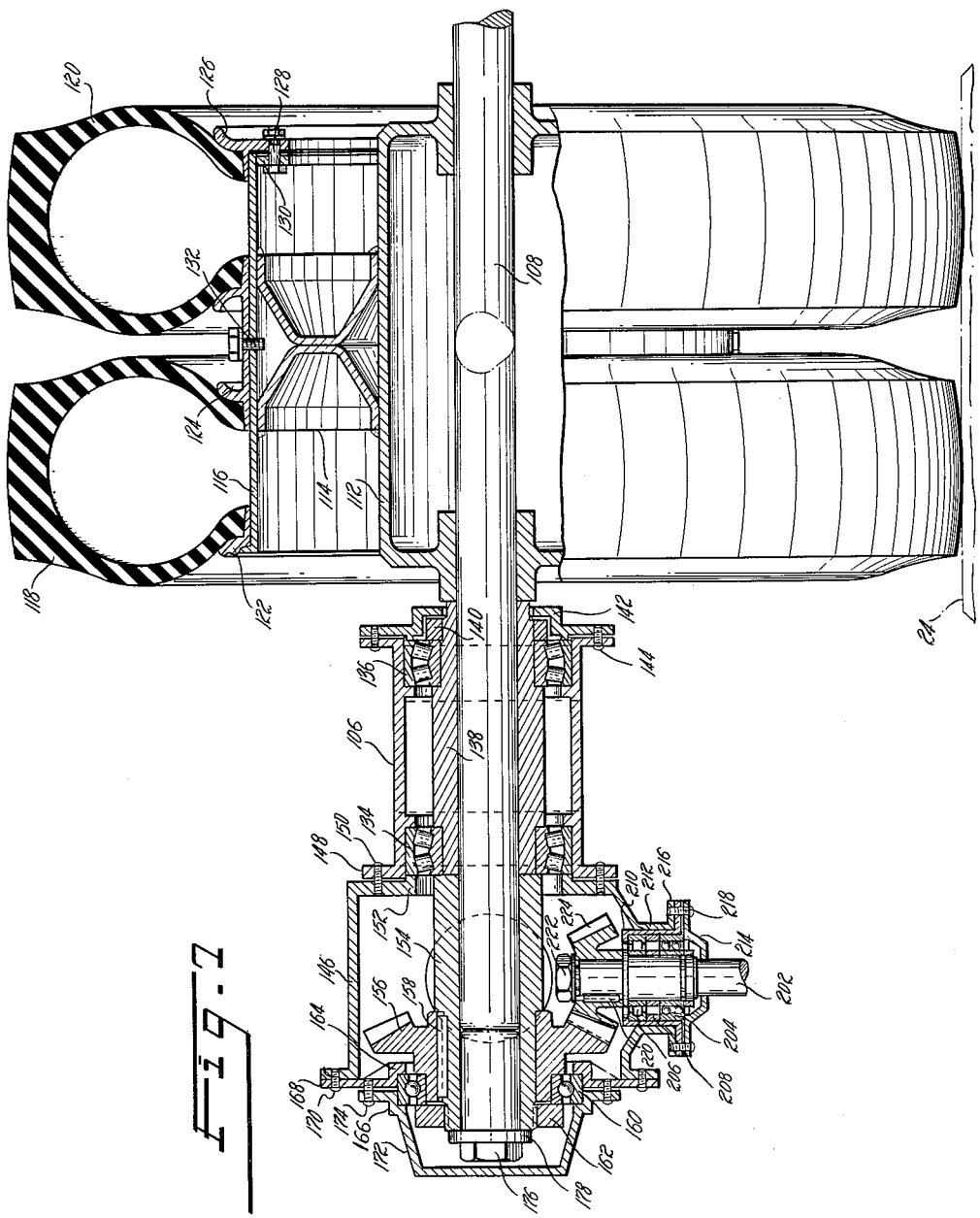

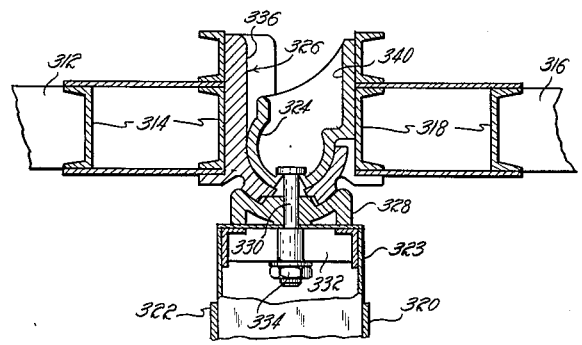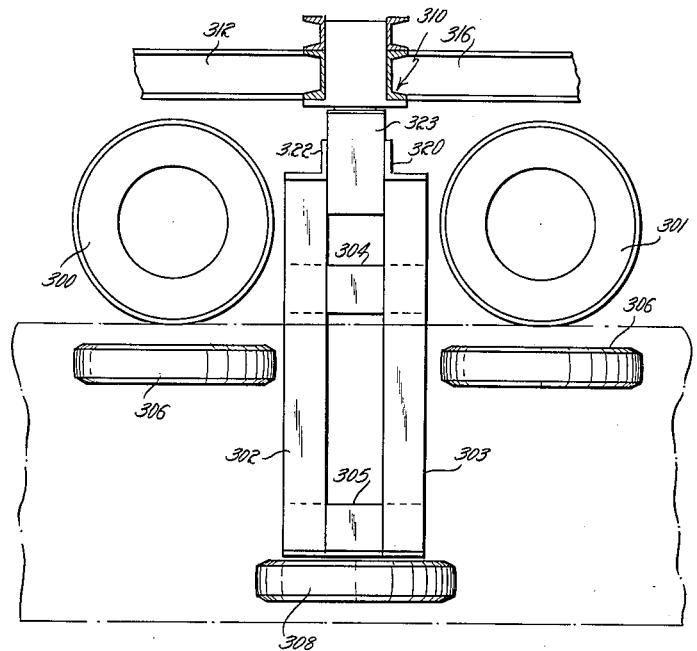

United States Patent Office 2,987,013
Patented June 6, 1961

2,987,013
VEHICLES
Kurt Rosenbaum, Koln, Germany, assignor to Alweg-Forschung G.m.b.H., Koln, Germany, a corporation of Germany
Filed Jan. 10, 1956, Ser. No. 558,376
Claims priority, application Germany Jan. 15, 1955
5 Claims. (Cl. 105—145)

This invention relates to vehicles and more particularly to improved undercarriage or chassis constructions for vehicles of the so-called monorail type.

In the past such vehicles have been supported at each end by a chassis unit including load carrying or supporting wheels adapted to ride over the top surface of the supporting beam and lateral stabilizing and guide wheels adapted to ride along the side beam surfaces. Constructions of this general type are disclosed in United States Patent 609,781 and co-pending application Serial No. 371,106, filed July 29, 1953 for Monotrack Transportation Systems and Apparatus, now abandoned.

While the vehicle construction shown in the aforesaid co-pending application is satisfactory for many purposes nevertheless it does have considerable weight because of the number of the load carrying, stabilizing and guiding wheels, the associated bearings and drive mechanisms, and the structural members necessary for their support.

It is the principal purpose and object of the present invention to provide improved vehicle and chassis constructions having reduced weight while maintaining the stability and load carrying characteristics of the best prior more complicated constructions.

In attaining this primary object and other objects the invention contemplates the provision of a novel vehicle and chassis construction in which a single chassis of novel construction is utilized to support the adjacent ends of two cars.

It is a further object of the invention to provide improved chassis constructions in which the number of wheels necessary to effectively support, stabilize and guide the vehicles is substantially reduced, thus reducing the running friction.

It is also an object to provide novel chassis units for monobeam vehicles which occupy a minimum space and thus increase the space available within the vehicle for carrying passengers or cargo.

It is an additional object to provide novel chassis units in which both the total weight and the unsprung weight are minimized.

It is a further object to provide novel chassis units for monobeam vehicles which facilitate the changing of wheels or tires when necessary.

Additional objects and advantages will become apparent as the description proceeds in connection with the accompanying drawings in which:

FIGURE 2 is an enlarged fragmentary elevation of a portion of the train shown in FIGURE 1 with the chassis being shown on a central vertical section and omitting the mounting means for the side wheels;

FIGURE 6 is a side elevation of the chassis of FIGURE 4;

FIGURE 7 is a section taken along lines 7—7 of FIGURE 5;

FIGURE 8 is a fragmentary section taken along line 8—8 of FIGURE 6 showing details of the mounting of the upper side wheels;

FIGURE 9 is a fragmentary section taken along line 9—9 of FIGURE 6 showing details of the mounting of the lower side wheels;

FIGURE 10 is a fragmentary section taken along line 10—10 of FIGURE 6 showing details for mounting the driving motors;

FIGURE 11 is a fragmentary semi-diagrammatic view of a modified form of the invention; and FIGURE 12 is an enlarged fragmentary central section of the upper portion of the unit of FIGURE 11.

While the chassis of the present invention may incorporate a varying number of supporting wheels it will be disclosed in a form which has been found to be particularly satisfactory for the intended use. In its preferred form, which will be described in detail below, the chassis has three sets of rubber tired supporting wheels.

Figure 1:
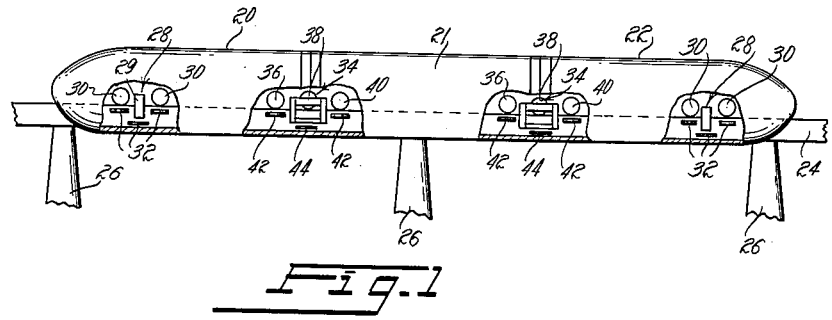
FIGURE 1 is a semi-diagrammatic side elevation of a monobeam train constructed in accordance with the present invention with parts broken away to show interior details.

Referring now more specifically to the drawings, FIGURE 1 shows diagrammatically a typical vehicle construction in accordance with the present invention. The monorail train as shown in FIGURE 1 comprises three cars 20, 21 and 22 adapted to partially encircle and travel along a monobeam 24 which is preferably supported at a predetermined height above the ground on pylons 26. The forward end of the lead car 20 and the rear end of the trailing car 22 are supported on identical chassis constructions indicated generally at 28 which form no part of the present invention and may take the form of the chassis constructions described in the aforesaid co-pending application Serial No. 371,106. While a detailed description is not believed necessary to an understanding of the invention it may be stated that each of the chassis constructions 28 includes a saddle shaped frame structure embracing the opposite sides of the beam on which a pair of load carrying wheels 30 and upper and lower sets of side rail wheels 32 are spring suspended. The frame structure of the chassis 28 is suitably secured to the vehicle to permit the required relative pivotal movement.

In accordance with conventional practice chassis constructions similar to that shown at 28 are included at the opposite ends of each of the cars thus necessitating six separate units for the three car train requiring a total of twelve sets of supporting wheels 30 and thirty-six sets of side wheels. In their preferred form the chassis units 34 of the present invention include forward, intermediate and rear sets of load carrying wheels indicated at 36, 38 and 40, four upper guide wheels 42 (two on each side of the beam) and two lower tilting wheels 44 (one on each side of the beam). Since the load carrying wheels sets ordinarily comprise dual wheels, in a three car train the chassis units of the present invention eliminate some sixteen wheels and the necessary supporting structure. Proportionately greater economies are effected of course in longer trains.

Figure 3:
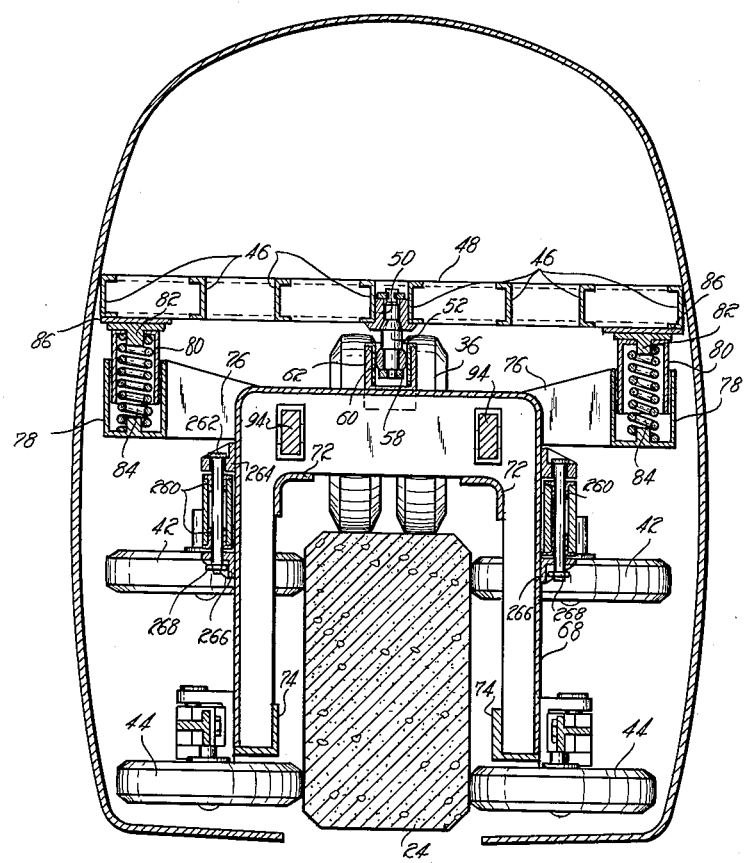
FIGURE 3 is a transverse section taken along line 3—3 of FIGURE 2.

As best shown in FIGURES 2 and 3 each of the cars is provided with depending side portions so that the beam is substantially enclosed by the car bodies. The principal structural components of the car bodies are longitudinally extending girders or beams 46 rigidly secured to the car frame (not shown). The girders 46 are bent upwardly adjacent the ends of the cars to accommodate the chassis units of the present invention. The longitudinally extending girders 46 carry at their ends spaced pairs of transverse support members 48. Mounted centrally of the vehicle in the substantially square opening between adjacent ones of the members 46 and 48 is a bushing 50. A pivot pin 52 is mounted in each of the bushings 50 and held in place by a nut 54. At their lower ends the pins 52 carry bearing elements 56, the outer surface of which is formed as a segment of a sphere. The bearing members 56 are held in place by nuts 58 threaded onto the lower end of the pins 52. The bearing members 56 are mounted for sliding and rotating movement in bushings 60 which are mounted in support members 62 and suitably secured to the chassis frame described in detail below. Since the bearings 56 are freely vertically movable in the bushings 60 no substantial vertical forces are transmitted between the car and the chassis through the pivot pins 52. The pins 52 and the associated structure are thus effective to permit pivotal and vertical movement of the car with respect to the chassis frame while preventing any substantial relative lateral or longitudinal displacement of the car with respect to the frame.

At their outer ends the beams 46 carry hinged flaps 64 which, when they occupy the position shown in FIGURE 2, provide a platform to permit passage of the occupants from one car to the other. The adjacent ends of the cars are enclosed by a resilient accordion structure indicated generally at 66.

The chassis frame is of welded construction and includes front and rear straps 68 and 70 which are preferably sheet metal stampings of U-shaped cross section. The straps 68 and 70 are rigidly secured together by upper and lower connecting beams 72 and 74. Four brackets 76 (two shown) are welded to and project outwardly from the upper corners of the strap members 68 and 70. Each of the brackets 76 carries a spring cup 78 in which is received a sleeve 80 the upper end of which carries a pressure plate 82. A coil spring 84 is compressed between the bottom of the cup 78 and the pressure plate 82 to urge the flat upper surface of the pressure plate 82 into sliding engagement with the under surface of segmental wear plates 86 welded to the undersurface of the cross members 48. Thus the four springs 84 and their associated mechanisms effectively transfer the weight of the car to the chassis and provide the desired spring suspension of the vehicle. Upon pivotal movements of the car about the axis of pins 52 the pressure plates 82 slide freely along the undersurface of the segmental wear plates 86.

Figure 4:
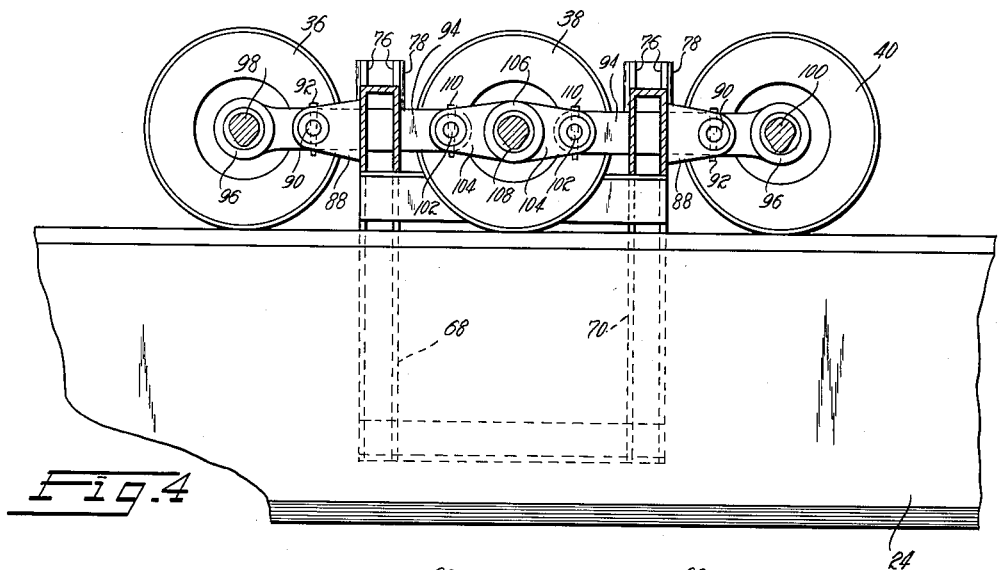
FIGURE 4 is a semi-diagrammatic view showing the construction of the support for the load carrying wheels.
Figure 5:
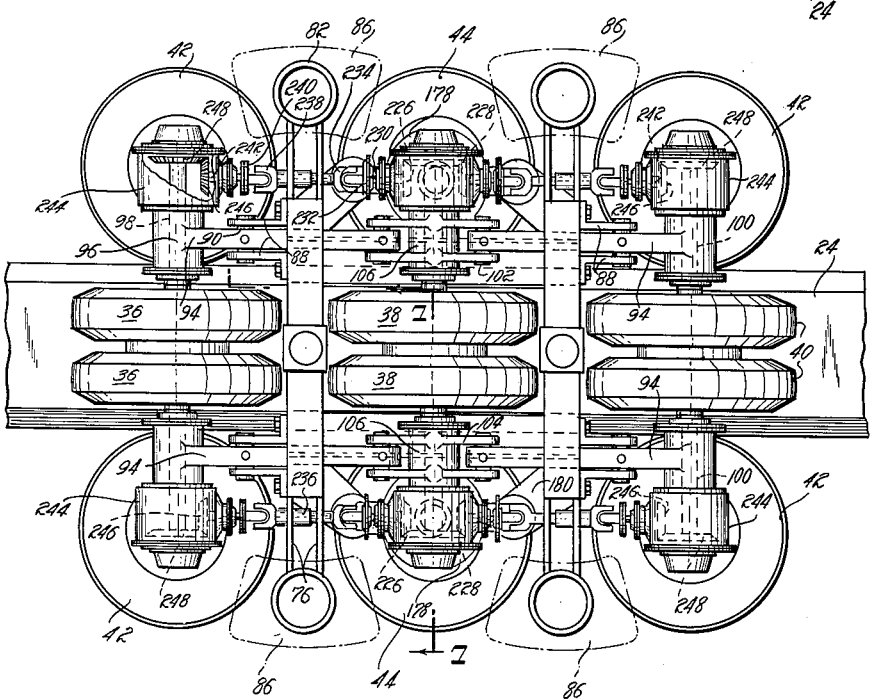
FIGURE 5 is a top plan view of the chassis shown removed from the vehicle.

As best shown in FIGURES 4 and 5 pairs of spaced brackets 88 are secured in the respective forward and rearward faces of the straps 68 and 70 and at their outer ends carry pivot pins 90. Mounted on the pins 90 and held in place by the taper pins 92 are arms 94 on the outer ends of which bearing lugs 96 are integrally formed which rotatably support the respective axle shafts 98 and 100 for the front and rear wheel sets 36 and 40 as described in detail below.

At their inner ends the arms 94 are pivotally connected by transverse pins 102 to a bifurcated lever 104 which is provided with a central hub 106 in which the axle shaft 108 of the intermediate load carrying wheels 38 is journalled in a manner described in detail below. Taper pins 110 are provided to retain the pins 102 in assembled relation.

The construction thus far described is so proportioned that the distance between the center of the wheel set 36 and the adjacent pin 90 and the distance between the center of the wheel set 40 and the adjacent pin 90 are each half the distance between the pins 90 and the center of wheel set 38 so that the weight of the cars is distributed uniformly over the three wheel groups.

Details of the mounting and driving mechanism for the intermediate wheel set 38 are shown in FIGURE 7 to which reference is now made. The main axle shaft 108, which as shown in phantom lines is of non-circular section, non-rotatably carries a sleeve 112 on the outer circumference of which an intermediate ring 114, X-shaped in section, is secured preferably by welding. A wheel rim 116 is welded on the outer surface of the intermediate ring 114 and forms a support for the two tubeless tires 118 and 120 which comprise the wheel set 38. Described in order of assembly, the rim 116 carries a flange ring 122 preferably press fitted on the rim, a first tubeless tire 118, a center flange ring 124, the second tubeless tire 120 and an outer flange ring 126 which is detachably secured by means of bolts 128 to a ring 130 welded to the inner surface of the rim 116. Screws 132 removably secure the center flange ring 124 to the rim 116 to prevent lateral displacement of the former in the event that one of the tires 118 or 120 becomes deflated. The projecting ends of the axle 108 are mounted in assemblies of identical construction only one of which will be described in detail with particular reference to FIGURE 7.

Fitted into the opposite ends of the previously described hub 106 formed integrally with the central portion of the bifurcated lever 104 are roller bearings 134 and 136 the inner races of which are fitted onto a bushing 138. The inner bore of the bushing 138 has the same configuration as the axle shaft 108 so that the two parts are connected for co-rotation. Bearing 136 is retained in position by means of an adjusting ring 140 screwed onto the bushing 138 and is enclosed by a cover 142 secured to the hub 106 as by screws 144. A gear box 146 containing the drive gearing for the wheel group 38 is secured to a flange 148 at the outer side of the hub 106 by means of bolts 150. Annular shoulder 152 on the gear box 146 retains the outer bearing 134 in place. A bushing 154 is fitted onto the outer end of the axle shaft 108 within the gear box 146 onto which a bevel gear 156 is telescoped, the gear and the bushing 154 being non-rotatably connected by a key 158.

The inner race of a ball bearing assembly 160 is held in place on the hub of the bevel gear 156 by an adjusting ring 162 threaded onto the outer end of the bushing 154. The outer race of the bearing 160 is clamped between annular shoulders 164 and 166 formed respectively on a flanged ring 168 secured to the outer flange of the gear case 146 by screws 170 and a cover plate 172 secured to the flange 168 by screws 174. A headed screw 176 is threaded into the outer end of the axle shaft 108 and a washer 178 is clamped between the head of the screw and the end of bushing 154 to prevent axial displacement of the shaft 108, it being understood that a similar constuction is provided at the opposite end of the axle shaft.

By virtue of this construction the wheels may be simply and easily demounted when necessary to change tires. For this purpose it is merely necessary to remove cover plates 172 and one of the screws 176 to free the axle 108 which may then be pulled laterally out of the assembly until it is free of the sleeve 112. The wheel group may then be lifted out, for example through a suitable door not shown in the car floor. The tires may then be easily demounted by removal of the flanges 126 and 124 and after repair of the tires the apparatus may be reassembled by reversing these steps.

In the illustrated embodiment of the invention each of the wheel groups 36 and 38 and 40 is driven. For this purpose identical motors and drive arrangements are provided on opposite sides of the chassis construction. Because of the identity of these constructions only the construction at one side of the chassis will be described with particular reference to FIGURES 5, 6, 7 and 10. The electric motors 178 are mounted on the side of the chassis so that the motor shafts extend vertically of the chassis. Motor mount brackets 180 are suitably secured to the front and rear straps 68 and 70 and are provided with vertically aligned openings for slidably receiving rods 182 which project downwardly from the opposite sides of the housing of the motor 178. The rods 182 carry pressure plates 184 against which compression springs 186 bear, the opposite ends of the springs bearing against pressure discs 188 which may be adjustably positioned by screws 190. The motor mount brackets 180 are also provided with slides 192 received for vertical sliding movement in ways 194 formed integrally with the opposite sides of the motor housing. Thus the motors are resiliently mounted for vertical movement but are restrained against movement in any other direction.

The drive from the motor 178 to the wheels is effected through a motor shaft 196 of non-circular section which leads upwardly through a conventional disc brake 198 and into a friction clutch 200. The output shaft 202 from the friction clutch extends upwardly into the gear case 146 and is mounted in a thrust bearing 204 for absorbing axial loads and a roller bearing 206 for absorbing lateral loads, the bearings being separated by a spacer ring 208. The bearings 204 and 206 together with the spacing ring 208 are received in a sleeve 210 mounted in an annular extension 212 of the gear case 146. An annular flange on the sleeve 210 together with a cover plate 214 are secured to a flange 216 of the gear case by bolts 218. Non-rotatably mounted on the upper end of the shaft 202 within gear casing 146 by means of a key 220 and a nut 222 is a pinion 224 which meshes with pinion 156. Thus the drive is transmitted from the motor 178 through the shafts 196 and 202, the pinions 224 and 156 to the axle shaft 108 to thereby drive the wheel set 38.

In accordance with the illustrated embodiment of the invention the motors 178 are also drivingly connected to the front and rear wheel sets 36 and 40 through the gear case 146. For this purpose two additional pinion and shaft assemblies 226 and 228 (FIGURE 5) are provided at the opposite sides of the gear case 146. Since the pinion, bearing and shaft assemblies are identical with the pinion and shaft assembly 202-224 the parts will not be described in detail.

The shaft 230 of the assembly 226 is connected through a friction clutch 232, a universal point 234, a telescoping shaft assembly 236, and a second universal joint 238 and a flange connector 240 to a shaft 242 which is mounted in a gear case 244 by a construction identical to that described above for mounting the shaft 202 in the gear case 146. Internally of the gear case 244 the shaft 242 non-rotatably carries a pinion 246 which meshes with a bevel gear 248 non-rotatably mounted on the axle shaft 98 carrying the forward wheel group 36. The gear case 244 is identical with the gear case 146 except that it is constructed to accommodate only one lateral shaft and pinion assembly rather than the three such assemblies incorporated in the gear case 146. The axle shaft 98 is also identical to the axle shaft 108 above described and is mounted in a bearing construction within the housing 96 similar to the construction shown in FIGURE 7 within the housing 106. It will be understood that an identical driving assembly is provided at the opposite side of the chassis and that similar constructions are provided for driving the rear wheel group 40. Preferably the wheel groups and the associated rim and hub constructions are identical.

For the sake of simplicity spur tooth bevel gears have been shown for driving the several wheel groups in lieu of the helical bevel gears which are preferably used in the commercial construction.

The mounting of the upper side wheel assemblies 42 will now be described with particular reference to FIGURES 3, 6 and 8. The wheel assemblies preferably include pneumatic tires and a rim and hub construction similar to that described in connection with FIGURE 7 for the wheel group 38. Considering the mounting of the forward wheel 42 the wheel axle is rotatably journalled by conventional bearing means in a boss 254 formed in the outer end of an arm 256 of a lever assembly indicated at 258. The hub of the lever assembly 258 is provided with internal bushings 260 journalled on a pivot pin 262, the projecting opposite ends of which are mounted in upper and lower brackets 264 and 266 respectively suitably secured as by welding to the strap 68 as best shown in FIGURE 3. The pivot pin 262 is held in place by a nut 268 threaded onto the lower end of the pin. The lever assembly 258 also includes a second lever arm 270 the free end of which carries a plunger 272 which extends into a spring cup 274 the inner flange of which is suitably secured to the cross member 72 of the main chassis frame. A coil spring 276 is compressed between the surface of the cross member 72 and a pressure plate 278 secured to the inner end of the plunger 272. Suitable connecting means 280 are provided between the plunger 272 and the lever arm 270 to vary the normal loading of the wheels 42. An identical construction is employed to mount the rearward ones of the upper wheels 42 and for mounting the two upper side wheels on the opposite side of the chassis.

The mounting of the lower side wheel assemblies 44 which are preferably of the same construction as the remaining wheels above described is best shown in FIGURES 6 and 9. Since the structure for mounting the wheel assemblies 44 is the same on each side of the chassis only one such mounting will be described. The axle 281 of the wheel assembly 44 is journalled in a suitable bearing assembly 282 positioned centrally of a lever arm 284, one end of which carries a hub 286 journalled on a pin 288 mounted on spaced brackets 290 rigidly secured to the strap member 68.

At its opposite end the lever assembly 284 is connected to a plunger 292 which extends into a spring cup 294 rigidly secured to the projecting end of the brace member 74. The inner end of the plunger 292 carries a pressure plate 296 against which a coil spring 298 bears. Again the connection between the lever 284 and the plunger 292 is such that the initial loading of the wheel 44 may be varied as desired. By virtue of the construction just described each of the wheels 42 and 44 at the opposite sides of the chassis are resiliently urged against the side surfaces of the monobeam 24, the upper wheels being effective primarily to guide the vehicle and the lower wheels being utilized primarily for absorbing tilting forces.

A further embodiment of the invention is shown in FIGURES 11 and 12 to which reference will now be made. In the chassis construction of FIGURE 11 two groups of supporting wheels 300 and 301 are provided. The supports and driving connections for these wheels may take essentially the same form as that disclosed above and have been omitted from FIGURE 11 for clarity. The chassis frame comprises the straps 302 and 303 which are connected by cross beams 304 and 305 and thus is of essentially the same construction as the chassis frame described above. The upper side wheels 306 and the lower side wheels 308 may be resiliently mounted in the same manner as the wheels 42 and 44 are mounted on the chassis frame described above.

The essential difference between the embodiment of FIGURES 11 and 12 and that of FIGURES 1 through 10 is that in the former the adjacent ends of the cars are connected to the chassis by a single swivel connection indicated generally at 310. The longitudinally extending structural car beams 312 and the cross beams 314 are equivalent to the members 46 and 48 respectively of car 20, for example, and the longitudinal beams 316 and the cross beams 318 are equivalent to the corresponding members 46 and 48 in car 21. Accordingly the swivel construction 310 fits between the adjacent ends of the cars 20 and 21 and supports both of them.

Mounted on the top of straps 302 and 303 and extending transversely of the car frame are angle irons 320 and 322 to which a box like bearing support structure 323 is welded or otherwise suitably secured. Three bearing members 324, 326 and 328 are secured together by a pivot pin 330 which extends through central openings in each of the members and into a support member 332 within the box-like structure 323. The parts are held in assembled relation by a nut 334 threaded onto the lower end of the pin 330. The bearing or supporting element 328 is provided with an upwardly facing spherical socket upon which rests a mating surface of the intermediate bearing member 326. Formed integrally with the bearing member 326 is an upwardly extending collar 336 which is rigidly secured to the outermost of the cross members 314 of the car 20. The inner surface of the intermediate bearing 326 and the outer surface of the upper bearing member 324 are also formed as mating portions of spheres. The bearing member 324 is provided with an integral extension 340 rigidly secured to the outermost transverse member 318 of the car 21. The swivel construction on which both of the cars are supported permits both cars to swivel in all directions relative to each other within certain limits. In contrast to the preferred embodiment of the invention, the swivel connection also transmits vertical forces between the car body and the chassis frame. If desired, constructions similar to the spring assemblies mounted on the brackets 76 as shown in FIGURE 3 may be incorporated in the unit of FIGURES 11 and 12 to lessen the vertical loads on the bearing members.

From the foregoing it will be apparent that the above-stated objects of the present invention have been attained by the provision of unique chassis and vehicle constructions having reduced weight, reduced running friction, simplicity and ruggedness of construction which may be manufactured and maintained at reduced expense.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A monobeam train comprising a plurality of cars adapted to straddle a track beam having top and side running surfaces, a chassis having wheels adapted to travel over said running surfaces of said beam, means forming a pivotal connection between said chassis and one end of one of said cars, means forming a pivotal connection between said chassis and the adjacent end of another of said cars, each of said pivot connections including a slide permitting relative vertical movement of the respective cars and the chassis, and resilient means mounted on said chassis and extending between said chassis and said cars for transmitting the weight of said cars to said chassis.

2. The train according to claim 1 wherein said resilient means includes a plurality of pressure plates yieldingly urged upwardly towards said cars and wherein wear plates are secured to the undersurface of said cars and are slidably engaged by said pressure plates.

3. A monobeam train comprising a plurality of cars adapted to straddle a track beam having a top surface and opposite lateral surfaces, an undercarriage between the adjacent ends of two cars, said undercarriage forming a frame for supporting the adjacent ends of two cars of said train, means mounted on said frame for resiliently supporting said ends of said cars and to transmit substantially only vertical forces between said cars and said undercarriage, further means mounted on said frame forming pivots having vertically extending slide connections whereby said pivots are adapted to transmit substantially only horizontal forces between said cars and said undercarriage, a plurality of wheels mounted in said undercarriage for rotation about horizontal axes for travel along said top running surface of said beam, and additional wheels mounted on said undercarriage for rotation about substantially vertical axes for travel along said lateral surfaces of said beam.

4. A chassis unit for supporting the adjacent ends of two cars in a monobeam train adapted to travel along a track beam having top and side running surfaces comprising, a frame structure, first, second and third wheel means, each adapted to ride on said top running surface of said track beam, means pivotally connecting said adjacent car ends to said frame, lever means pivotally mounted on said frame, means supporting each of said wheel means on said lever means for rotation about substantially horizontal axes, said lever means being so mounted and proportioned that the loads imposed on said frame by said cars are divided equally between said first, second and third wheel means, spring means independent of the pivotal connection between said cars and said frame for spring suspending said cars, and lateral wheels rotatably supported on said frame for travel along the beam side surfaces.

5. A chassis unit for supporting the adjacent ends of two cars in a monobeam train adapted to travel along a track beam having top and side running surfaces comprising, a frame structure, three wheel means, each wheel means including at least one wheel adapted to ride over said top surface of said track beam, means for pivotally connecting said adjacent car ends to said frame, a first lever assembly mounted on said frame for pivotal movement about a substantially horizontal axis transverse to the longitudinal axis of said beam, a second lever assembly also mounted on said frame for pivotal movement about a substantially horizontal axis transverse to the longitudinal axis of said track beam, means mounting one of said wheel means adjacent one end of said first lever assembly for rotation about a substantially horizontal axis, means mounting another of said wheel means adjacent one end of said second lever assembly for rotation about a substantially horizontal axis, a mounting assembly for the third wheel means, means pivotally connecting said mounting assembly to the other ends of said first and second lever assemblies, said lever assemblies being so mounted and proportioned that the loads imposed on said frame by said cars are divided equally between said wheel means, spring means independent of the pivotal connection between said cars and said frame for spring suspending said cars, and additional wheels mounted on said frame for rotation about substantially vertical axes for travel along said side beam surfaces.

References Cited in the file of this patent

UNITED STATES PATENTS

| | | |
|---|---|---|
| 456,103 | Turner et al. | July 14, 1891 |
| 494,081 | Pruyn | Mar. 21, 1893 |
| 922,750 | Clark | May 25, 1909 |
| 1,043,793 | Barnes | Nov. 12, 1912 |
| 1,336,361 | McClure et al. | Apr. 6, 1920 |
| 2,111,676 | Ritchie | Mar. 22, 1938 |
| 2,150,116 | Farr | Mar. 7, 1939 |
| 2,155,615 | Rice | Apr. 25, 1939 |
| 2,189,642 | Stertzbach et al. | Feb. 6, 1940 |
| 2,737,126 | Rossell | Mar. 6, 1956 |

FOREIGN PATENTS

| | | |
|---|---|---|
| 428,764 | France | June 29, 1911 |
| 808,297 | France | Nov. 6, 1937 |
| 1,139,330 | France | Feb. 11, 1957 |